US012730637B2

(12) United States Patent
Alsop et al.

(10) Patent No.: US 12,730,637 B2
(45) Date of Patent: Sep. 8, 2026

(54) METHOD FOR IMPROVING GPU EFFICIENCY VIA PROGRAMMATIC TESTS OF SYNCHRONIZATION PRIMITIVE PROGRESS

(71) Applicant: Advanced Micro Devices, Inc., Santa Clara, CA (US)

(72) Inventors: Johnathan Alsop, Seattle, WA (US); Bradford M. Beckmann, Kirkland, WA (US)

(73) Assignees: Advanced Micro Devices, Inc., Santa Clara, CA (US); ATI Technologies ULC, Markham (CA)

(*) Notice: Subject to any disclaimer, the term of this patent is extended or adjusted under 35 U.S.C. 154(b) by 5 days.

(21) Appl. No.: 18/898,080

(22) Filed: Sep. 26, 2024

(65) Prior Publication Data

US 2026/0086807 A1 Mar. 26, 2026

(51) Int. Cl.
*G06F 9/30* (2018.01)
*G06F 9/52* (2006.01)

(52) U.S. Cl.
CPC .......... *G06F 9/30087* (2013.01); *G06F 9/522* (2013.01); *G06F 9/30036* (2013.01)

(58) Field of Classification Search
CPC ... G06F 9/30087; G06F 9/522; G06F 9/30036
See application file for complete search history.

(56) References Cited

U.S. PATENT DOCUMENTS

| | | | | |
|---|---|---|---|---|
| 6,442,679 | B1 * | 8/2002 | Klauser | G06F 9/383 712/E9.05 |
| 9,417,875 | B2 * | 8/2016 | Fahs | G06F 9/3851 |
| 10,955,901 | B2 | 3/2021 | Ashkar et al. | |
| 11,170,462 | B1 | 11/2021 | Fernlund et al. | |
| 2007/0143755 | A1 * | 6/2007 | Sahu | G06F 9/3851 712/E9.05 |
| 2010/0153761 | A1 * | 6/2010 | Nishioka | G06F 11/3423 713/323 |
| 2017/0160781 | A1 * | 6/2017 | Piga | G06F 1/3287 |
| 2020/0081748 | A1 * | 3/2020 | Johnson | G06F 9/522 |

* cited by examiner

*Primary Examiner* — Corey S Faherty
(74) *Attorney, Agent, or Firm* — Kowert, Hood, Munyon Rankin & Goetzel, P.C.; Rory D. Rankin

(57) ABSTRACT

An apparatus and method for efficiently scheduling instructions for a parallel data processing circuit. In various implementations, a computing system includes a parallel data processing circuit with multiple compute circuits, each uses multiple single instruction multiple data (SIMD) circuits. Each compute circuit includes a scheduler for selecting instructions to issue to the SIMD circuits. During execution, a thread executes an instruction that provides a point of synchronization. Examples are the wait instruction and the barrier instruction. A control circuit accesses the metrics indicating hardware behavior of the corresponding wave. Based on these metrics, the control circuit generates a prediction of the amount of time before the point of synchronization completes. For example, the prediction indicates how soon each of the other threads of the corresponding wave are to arrive at the point of synchronization. The prediction is used to update control flow of the thread.

20 Claims, 7 Drawing Sheets

Program Code 300

Code 310

```
unroll_factor = 2
for i=0; i<n; i+= unroll_factor:
  r1 = load_data(i+0)
  r2 = load_data(i+1)
  waitcnt()
  do_work(r1)
  do_work(r2)
```

Code 320

```
# assume r3 and r4 contain live values that are
# used elsewhere in the kernel.
for i=0; i<n; :
  r1 = load_data(i+0)
  r2 = load_data(i+1)
  if waitcnt.completion > threshold
    waitcnt()
    do_work(r1)
    do_work(r2)
    i += 2
  else:
    reg_spill r3, r4 -> mem
    r3 = load_data(i+2)
    r4 = load_data(i+3)
    waitcnt()
    do_work(r1)
    do_work(r2)
    do_work(r3)
    do_work(r4)
    reg_fill mem -> r3, r4
    i += 4
```

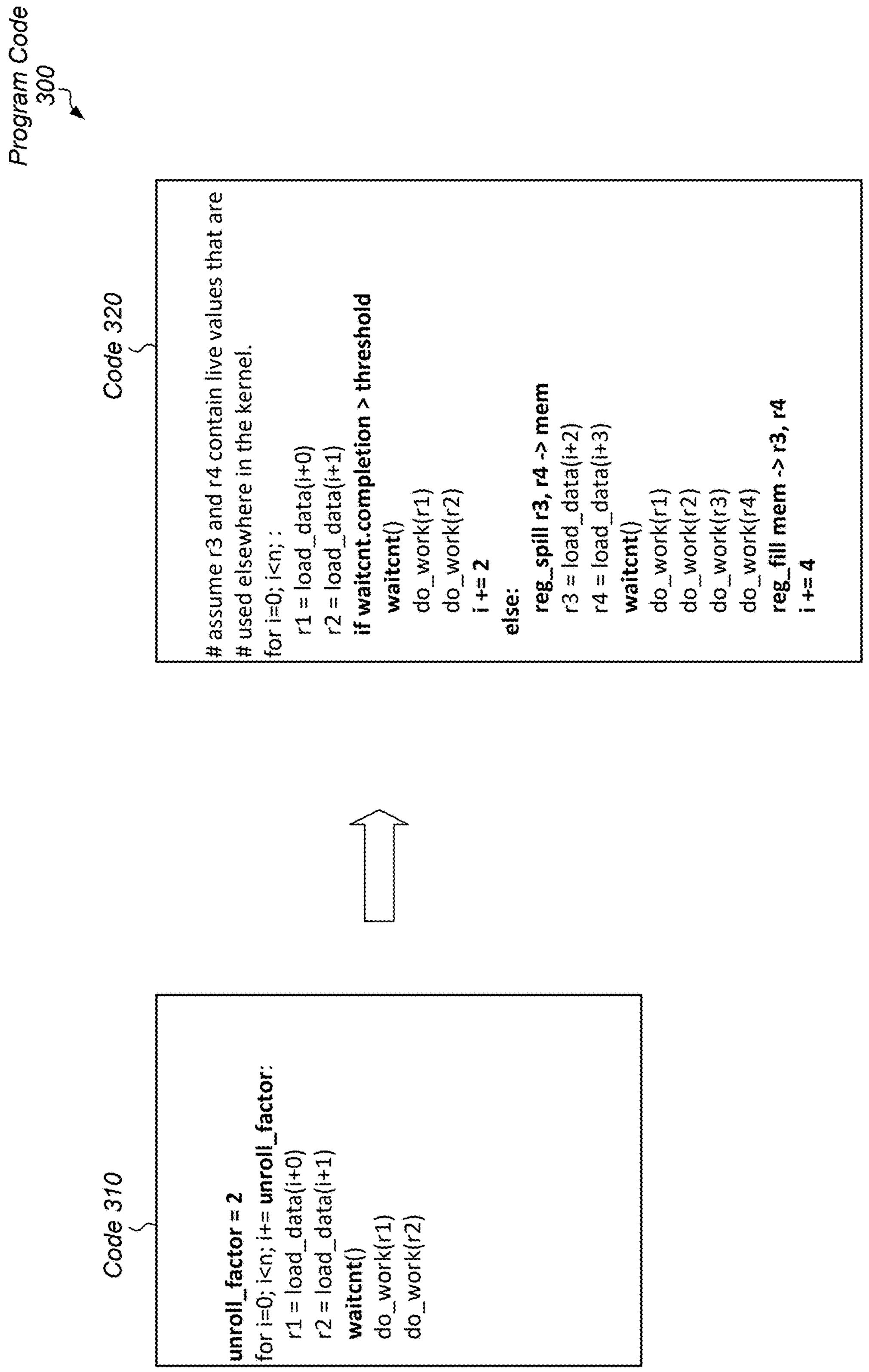

FIG. 3

Method 700

Execute multiple waves by a compute circuit with multiple vector processing circuits, each with multiple lanes of execution
702

Receive a prediction by a thread of a wave indicating the amount of time until a point of synchronization completes
704

Does the prediction indicate that the point of synchronization completes prior to a threshold amount of time elapses?
706

Yes

Update control flow of the thread to progress and process next instructions
708

No

Update control flow of the thread to continue waiting
710

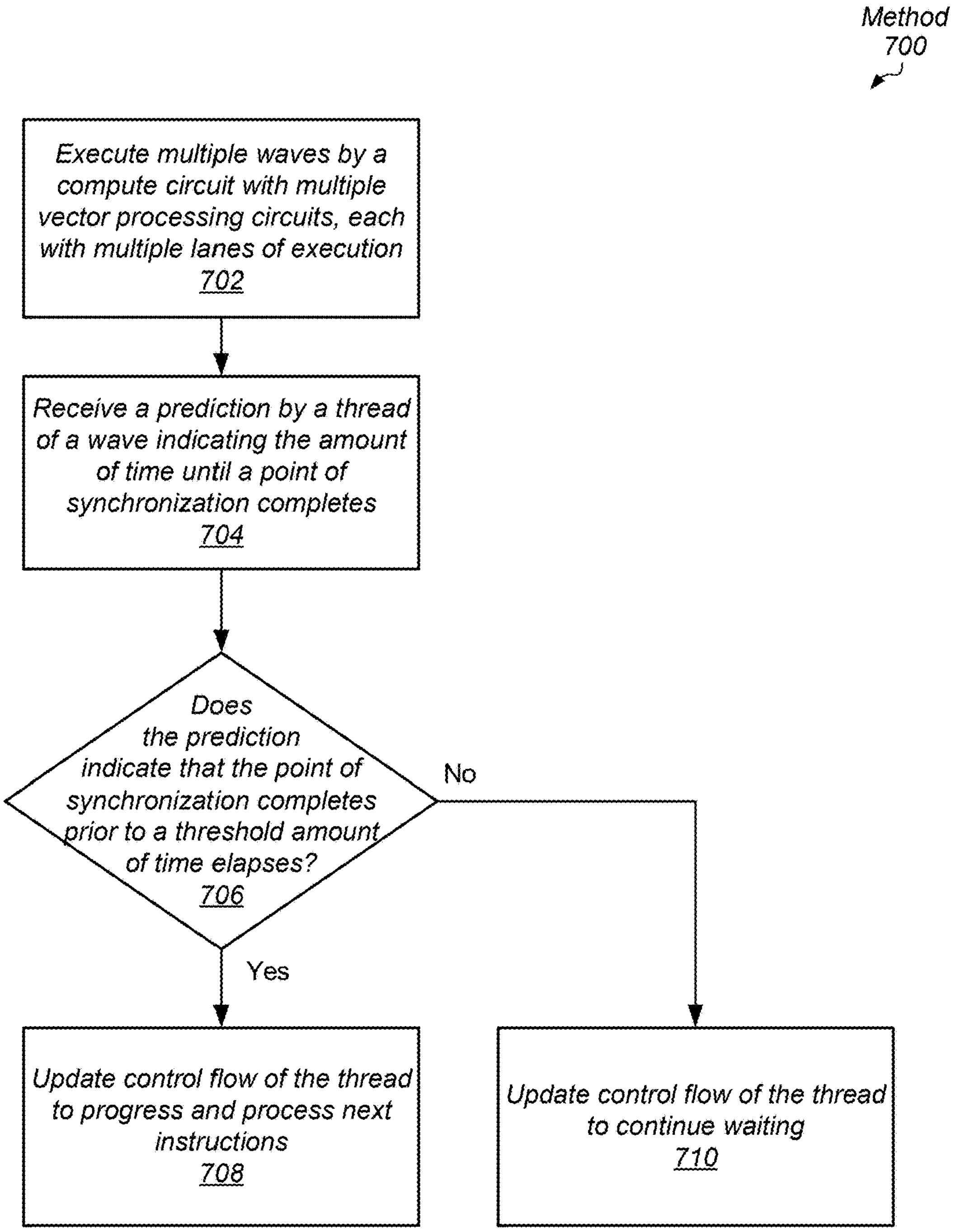

FIG. 7

METHOD FOR IMPROVING GPU EFFICIENCY VIA PROGRAMMATIC TESTS OF SYNCHRONIZATION PRIMITIVE PROGRESS

BACKGROUND

Description of the Relevant Art

The parallelization of tasks is used to increase the throughput of computing systems. To this end, compilers extract parallelized tasks from applications to execute in parallel on the system hardware. To increase parallel execution on the hardware, many different types of computing systems include vector processing circuits or single-instruction, multiple-data (SIMD) circuits. Vector processing circuits, or SIMD circuits, include multiple parallel lanes of execution. Tasks can be executed in parallel on these types of parallel data processing circuits to increase the throughput of the computing system. The memory stores at least the instructions (or translated commands) of a parallel data application. The instructions are placed in kernels, each corresponding to a function call in the parallel data application. These types of micro-architectures provide higher instruction throughput for parallel data applications than a general-purpose micro-architecture. Tasks that benefit from the SIMD micro-architecture are used in a variety of applications in a variety of fields such as medicine, entertainment, engineering, social media, science, finance, and so on.

The throughput of the SIMD micro-architecture is highly dependent on the instructions filling the pipeline stages of the parallel execution lanes of the SIMD circuits. When a pipeline stage does not receive an instruction to process, the pipeline stage has a stall, or a "bubble," inserted in it and no useful work is performed for that pipeline stage. For example, barrier and wait instructions are used in parallel data applications to block threads from progressing until prior operations, which can often include memory accesses, complete. This can lead to delays and underutilization of hardware resources. When the multiple parallel lanes of execution remained idle for an appreciable amount of time, performance reduces.

In view of the above, efficient methods and apparatuses for efficiently scheduling instructions for a parallel data processing circuit are desired.

BRIEF DESCRIPTION OF THE DRAWINGS

FIG. 3 is a generalized diagram of an apparatus that efficiently schedules instructions for a parallel data processing circuit.

FIG. 7 is a generalized diagram of a method for efficiently scheduling instructions for a parallel data processing circuit.

Figure 1:
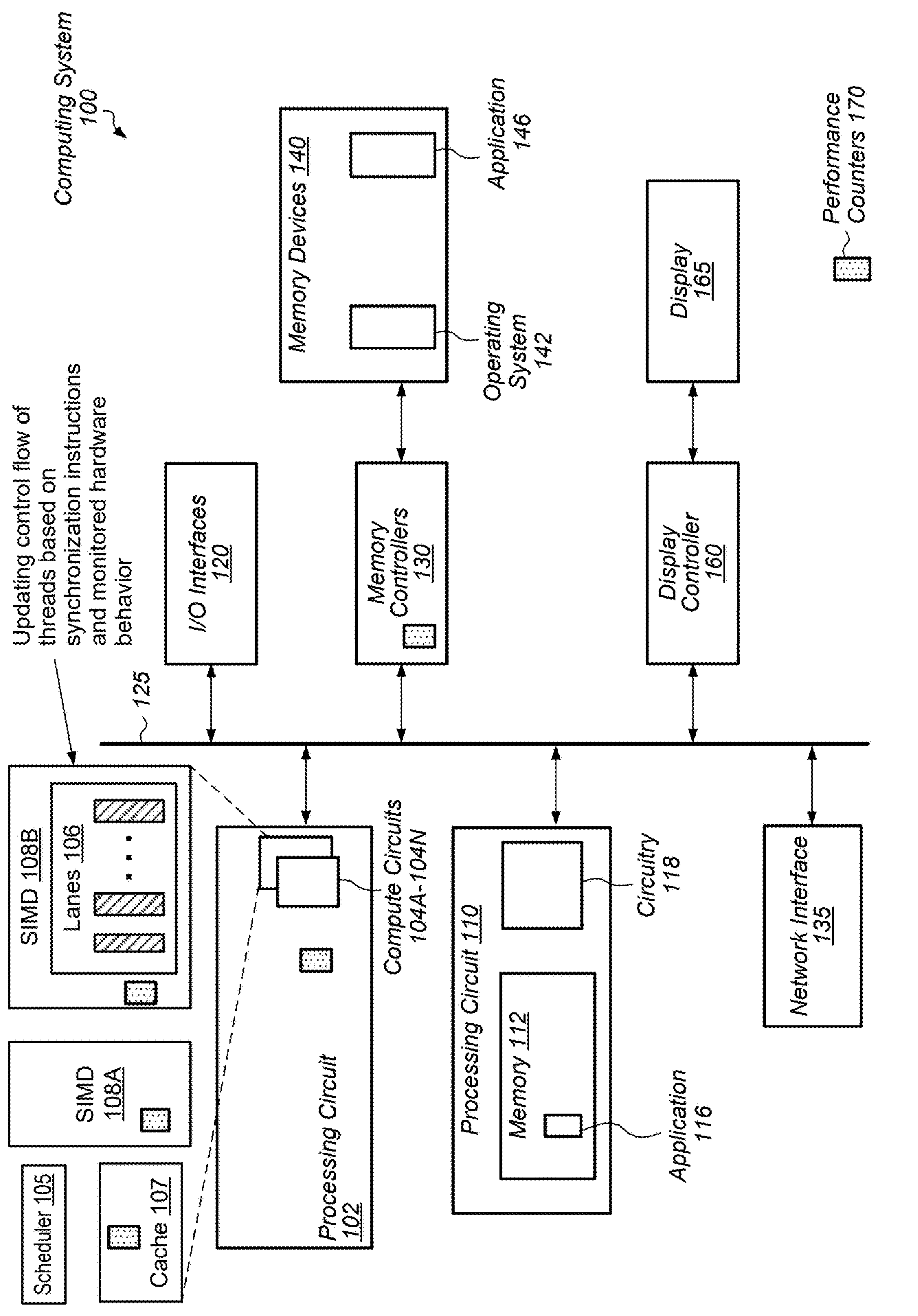
FIG. 1 is a generalized diagram of a computing system that efficiently schedules instructions for a parallel data processing circuit.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods for efficiently scheduling instructions for a parallel data processing circuit are disclosed. In various implementations, a computing system includes a parallel data processing circuit that includes one or more compute circuits, each with multiple single instruction multiple data (SIMD) circuits. As used herein, a "SIMD" circuit can also be referred to as a "vector processing circuit." Each of the SIMD circuits includes circuitry of multiple parallel lanes of execution, and using the multiple parallel lanes, executes a wavefront (or "wave") of multiple wavefronts (or "waves") of a workgroup. Each compute circuit includes a scheduler for selecting instructions to issue to the SIMD circuits.

During execution, the parallel data processing circuit monitors hardware behavior during execution of the multiple waves. The parallel data processing circuit uses a variety of types of hardware performance counters and monitors distributed across the parallel data processing circuit to perform the monitoring of hardware behavior. During execution, threads can execute an instruction that provides a point of synchronization. Examples are the wait instruction and the barrier instruction. If a thread of a wave executing on a lane of the multiple lanes of execution of a vector processing circuit has reached a point of synchronization, then a control circuit accesses the metrics indicating hardware behavior of the corresponding wave. Based on these metrics, the control circuit generates a prediction of the amount of time until the point of synchronization is completed. For example, the prediction indicates how soon each of the other threads of the corresponding wave are to arrive at the point of synchronization. The prediction is used by one of the control circuit, the scheduler and the lane executing the thread to update the control flow of the thread.

Without monitoring (tracking) the hardware behavior of the executing multiple waves and predicting the amount of time until the point of synchronization is completed based on this monitoring, no update of the control flow of the thread is performed. Therefore, the early arriving threads of a given wave merely wait in an idle state until the late arriving threads reach the synchronization point. This condition leads to delays and underutilization of hardware resources. When the multiple parallel lanes of execution remained idle for an appreciable amount of time, performance reduces. The control circuit can generate the prediction of the amount of time until the point of synchronization is completed by generating a weighted sum of one or more parameters stored in the hardware performance counters. For a wait instruction, the control circuit accesses the hardware performance counters to obtain the number of pending memory access requests for the given wave and an average cache hit rate of a cache accessed by the given wave.

For a barrier instruction, the control circuit accesses the hardware performance counters to obtain an indication of throughput for the given wave and an indication of a program counter difference between the first thread and other threads of the given wave. When the prediction of the amount of time is less than the time threshold, and a wait instruction provides synchronization, the wave proceeds with execution of arithmetic instructions of early arriving threads that use data values of memory access instructions already executed and the wave waits to perform further memory access instructions. When the prediction of the amount of time is less than the time threshold, and a barrier instruction provides synchronization, the wave executes instructions between a barrier arrive instruction and a barrier wait instruction for the early arriving threads. Further details of these techniques for efficiently scheduling instructions for a parallel data processing circuit are provided in the following description of FIGS. 1-7.

Turning now to FIG. 1, a generalized diagram is shown of a computing system 100 that efficiently schedules instructions for a parallel data processing circuit. In an implementation, computing system 100 includes at least processing circuits 102 and 110, input/output (I/O) interfaces 120, bus 125, network interface 135, memory controllers 130, memory devices 140, display controller 160, and display 165. In other implementations, computing system 100 includes other components and/or computing system 100 is arranged differently. For example, power management circuitry, and phased locked loops (PLLs) or other clock generating circuitry are not shown for ease of illustration. In various implementations, the components of the computing system 100 are on the same die such as a system-on-a-chip (SOC). In other implementations, the components are individual dies in a system-in-package (SiP) or a multi-chip module (MCM). A variety of computing devices use the computing system 100 such as a desktop computer, a laptop computer, a server computer, a tablet computer, a smartphone, a gaming device, a smartwatch, and so on.

Processing circuits 102 and 110 are representative of any number of processing circuits which are included in computing system 100. In an implementation, processing circuit 110 is a general-purpose central processing unit (CPU). In one implementation, processing circuit 102 is a parallel data processing circuit with a highly parallel data microarchitecture, such as a GPU. The processing circuit 102 can be a discrete device, such as a dedicated GPU (dGPU), or the processing circuit 102 can be integrated (an iGPU) in the same package as another processing circuit. Other parallel data processing circuits that can be included in computing system 100 include digital signal processing circuits (DSPs), field programmable gate arrays (FPGAs), application specific integrated circuits (ASICs), and so forth.

In various implementations, the processing circuit 102 includes multiple, replicated compute circuits 104A-104N, each including similar circuitry and components such as a single instruction multiple data (SIMD) circuits 108A-108B, the cache 107, and hardware resources (not shown). SIMD circuit 108A includes replicated circuitry of the circuitry of the SIMD circuit 108B. Although two SIMD circuits are shown, in other implementations, another number of SIMD circuits is used based on design requirements. As shown, the SIMD circuit 108B includes multiple, parallel computational lanes 106. Cache 107 can be used as a shared last-level cache in a compute circuit.

In various implementations, the data flow of SIMD circuit 108B is pipelined and the parallel execution lanes 106 operate in lockstep. In various implementations, the circuitry of each of the execution lanes 106 is an instance of circuitry for arithmetic logic units (ALUs) that perform integer arithmetic, floating-point arithmetic, Boolean logic operations, branch condition comparisons, and so forth. Each of the ALUs within a given row across execution lanes 106 includes the same circuitry and functionality, and operates on the same instruction, but different data, such as a different data item, associated with a different thread. Pipeline registers are used for storing intermediate results.

A particular combination of the same instruction and a particular data item of multiple data items is referred to as a "work item." A work item is also referred to as a thread. The multiple work items (or multiple threads) are grouped into thread groups, where a "thread group" is a partition of work executed in an atomic manner. In some implementations, a thread group includes instructions of a function call that operates on multiple data items concurrently. Each data item is processed independently of other data items, but the same sequence of operations of the subroutine is used. As used herein, a "thread group" is also referred to as a "work block," a "wavefront," or a "wave."

Tasks performed by execution lanes 106 can be grouped into a "workgroup" that includes multiple thread groups (or multiple wavefronts or multiple waves). Each of the compute circuits 104A-104N processes an assigned workgroup, and each of the SIMD circuits 108A-108B processes an assigned wavefront. The hardware, such as circuitry, of a scheduler (not shown) divides the workgroup into separate thread groups (or separate wavefronts) and assigns the wavefronts to be dispatched to SIMD circuits 108A-108B. In an implementation, such a scheduler is a command processing circuit of a GPU. In various implementations, scheduler 105 receives the wavefronts for one of the compute circuits 104A-104N, and schedules instructions of these wavefronts to be issued to SIMD circuits 108A-108B.

During execution, processing circuit 102 monitors hardware behavior of the multiple waves. Processing circuit 102 uses a variety of types of hardware performance counters 170 and hardware monitors distributed across processing circuit 102 to perform the monitoring of hardware behavior. Examples of the type of hardware behavior being monitored by the performance counters 170 for each wave of the multiple waves include a number of pending memory access requests for the wave, an average memory access latency for the wave, an indication of the average data size of memory accesses performed by the wave, an indication of the average cache hit rates of one or more levels of caches accessed by the wave, throughput for the wave that can be measured by the rate of instructions being completed or retired by the wave, the rate of instructions being issued by the wave, metrics indicating the throughput or contention at different points in the memory system (e.g., the memory controller), or otherwise.

During execution, threads can execute an instruction that provides a point of synchronization. Examples are the wait instruction and the barrier instruction. If a thread of a wave executing on a lane of the multiple lanes of execution of a vector processing circuit has reached a point of synchronization, then a control circuit accesses the metrics indicating hardware behavior of the corresponding wave. In some implementations, the control circuit is in scheduler 105. Based on these metrics, the control circuit generates a prediction of the amount of time before the point of synchronization is completed. For example, the prediction indicates how soon each of the other threads of the corresponding wave are to arrive at the point of synchronization. The prediction is used by one of the control circuit, scheduler 105, and the lane of lanes 106 executing the thread to update control flow of the thread.

To generate the prediction, in an implementation, the control circuit, such as scheduler 105, accesses the parameters (or metrics) and generates a weighted sum using one or more of the parameters. Examples of the other parameters or metrics accessed by the control circuit are the percentage of threads of the wave that have arrived at the point of synchronization, whether the synchronization is provided by a wait instruction or a barrier instruction, a program counter difference between the thread that arrived at the point of synchronization and one or more other threads of the wave participating in the barrier. Other metrics for indicating how soon the other threads are to arrive at the point of synchronization are also possible and contemplated.

The weights used to generate the prediction can be stored in programmable configuration registers. In an implementation, for generating the weighted sum, scheduler 105 selects a set of weights and a set of parameters based on the type of the point of synchronization. For example, the instruction that provided the point of synchronization can be at least the wait instruction or the barrier instruction. In some implementations, the prediction is the result of the weighted sum. In an implementation, this weighted sum is compared to a threshold to determine which control flow path to select and execute. In another implementation, using the weighted sum, scheduler 105 can index into a table or other data structure storing predictions of the amount of time until the point of synchronization is completed. Scheduler 105 retrieves the predicted amount of time from the table or other data structure. Scheduler 105 compares the retrieved predicted amount of time to a corresponding threshold to determine which control flow path to select and execute.

In other implementations, scheduler 105 generates a bit mask based on comparisons of the parameters retrieved from the hardware performance counters and monitors 170 distributed across processing circuit 102 and corresponding thresholds. Each bit of the bit mask is based on one of the comparisons. In an implementation, assertion of a first bit of the bit mask is based on the number of pending memory access requests for the wave exceeding a first threshold. The assertion of a second bit of the bit mask is based on the number of pending memory access requests for the wave exceeding a second threshold. Assertion of a third bit of the bit mask is based on the average cache hit rates of one or more levels of caches accessed by the wave exceeding a third threshold, and so on. Scheduler 105 maps the bit mask to a predicted amount of time until the point of synchronization is completed. In an implementation, using the bit mask, scheduler 105 can index into the table or other data structure storing predictions of the amount of time until the point of synchronization is completed. In any of these implementations, the amount of time can be indicated by a number of clock cycles, an estimate of an absolute amount of time, an output bit mask representing a range of time in clock cycles or real time, and so on. Scheduler 105 retrieves the predicted amount of time from the table or other data structure. Scheduler 105 compares the retrieved predicted amount of time to a corresponding threshold to determine which control flow path to select and execute.

In an implementation, the instruction that provided the point of synchronization is the wait instruction, the percentage of threads of the wave that have arrived at the point of synchronization is 25%, a largest program counter difference between the thread that arrived at the point of synchronization and another thread of the wave is ten instructions, and the number of pending memory access requests for the wave is 20, which exceeds a threshold of 15 pending memory access request. Using a range of weights between 0 and 100 (as just an example), the control circuit assigns a weight of 75 to the percentage of threads, a weight of 60 to the program counter difference and a weight of 95 to the number of pending memory access requests. The sum is 230, which exceeds a threshold of 150. The control circuit generates an indication that the predicted amount of time is greater than a threshold and the point of synchronization will not be reached soon. A variety of other methods can be used to generate the prediction of the amount of time until the point of synchronization is completed based on the parameters stored in hardware performance counters and other hardware monitors 170. In other implementations, scheduler 105 provides the prediction of the amount of time until the point of synchronization is completed to a separate control circuit or the lane of lanes 106 executing the thread to update control flow of the thread.

In some implementations, each of the application 104 stored on the memory devices 140 and its copy (application 116) stored on the memory 112 is a highly parallel data application. The highly parallel data application includes function calls that allow the developer to insert requests in the highly parallel data application for launching wavefronts of a kernel (function call). In various implementations, circuitry 118 of the processing circuit 110 converts (translates) the instructions of the highly parallel data application to commands. In various implementations, the processing circuit 110 stores the commands in a ring buffer in system memory provided by memory devices 140. Processing circuit 102 reads the commands from the ring buffer in the system memory provided by memory devices 140. In an implementation, the ring buffer includes multiple storage locations of the memory devices 140 used to provide a memory mapped input/output (MMIO) first-in-first-out (FIFO) buffer.

In some implementations, application 104 is a highly parallel data application that provides multiple kernels to be executed on the compute circuits 104A-104N. The high parallelism offered by the hardware of the compute circuits 104A-104N is used for real-time data processing. Examples of real-time data processing are rendering multiple pixels, image blending, pixel shading, vertex shading, and geometry shading. In such cases, each of the data items of a wavefront is a pixel of an image. Compute circuits 104A-104N can also be used to execute other threads that require operating simultaneously with a relatively high number of different data elements (or data items). Examples of these threads are threads for scientific, medical, entertainment, finance and encryption/decryption computations.

Memory 112 represents a local hierarchical cache memory subsystem. Memory 112 stores source data, intermediate results data, results data, and copies of data and instructions stored in memory devices 140. Processing circuit 110 is coupled to bus 125 via interface 106. Processing circuit 110 receives, via interface 106, copies of various data and instructions, such as the operating system 142, one or more device drivers such as device driver 144, one or more applications such as application 104, and/or other data and instructions. The processing circuit 110 retrieves a copy of the application 104 from the memory devices 140, and the processing circuit 110 stores this copy as application 116 in memory 112.

In some implementations, computing system 100 utilizes a communication fabric ("fabric"), rather than the bus 125, for transferring requests, responses, and messages between the processing circuits 102 and 110, the I/O interfaces 120, the memory controllers 130, the network interface 135, and the display controller 150. When messages include requests for obtaining targeted data, the circuitry of interfaces within the components of computing system 100 translates target addresses of requested data. In some implementations, the bus 125, or a fabric, includes circuitry for supporting communication, data transmission, network protocols, address formats, interface signals and synchronous/asynchronous clock domain usage for routing data.

Memory controllers 130 are representative of any number and type of memory controllers accessible by processing circuits 102 and 110. While memory controllers 130 are shown as being separate from processing circuits 102 and 110, it should be understood that this merely represents one possible implementation. In other implementations, one of memory controllers 130 is embedded within one or more of processing circuits 102 and 110 or it is located on the same semiconductor die as one or more of processing circuits 102 and 110. Memory controllers 130 are coupled to any number and type of memory devices 140.

Memory devices 140 are representative of any number and type of memory devices. For example, the type of memory in memory devices 140 includes Dynamic Random Access Memory (DRAM), Static Random Access Memory (SRAM), NAND Flash memory, NOR flash memory, Ferroelectric Random Access Memory (FeRAM), or otherwise. Memory devices 140 store at least instructions of an operating system 142, one or more device drivers, and application 146. In some implementations, application 146 is a highly parallel data application such as a video graphics application, a shader application, or otherwise. Copies of these instructions can be stored in a memory or cache device local to processing circuit 110 and/or processing circuit 102.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 receives and sends network messages across a network.

Figure 2:
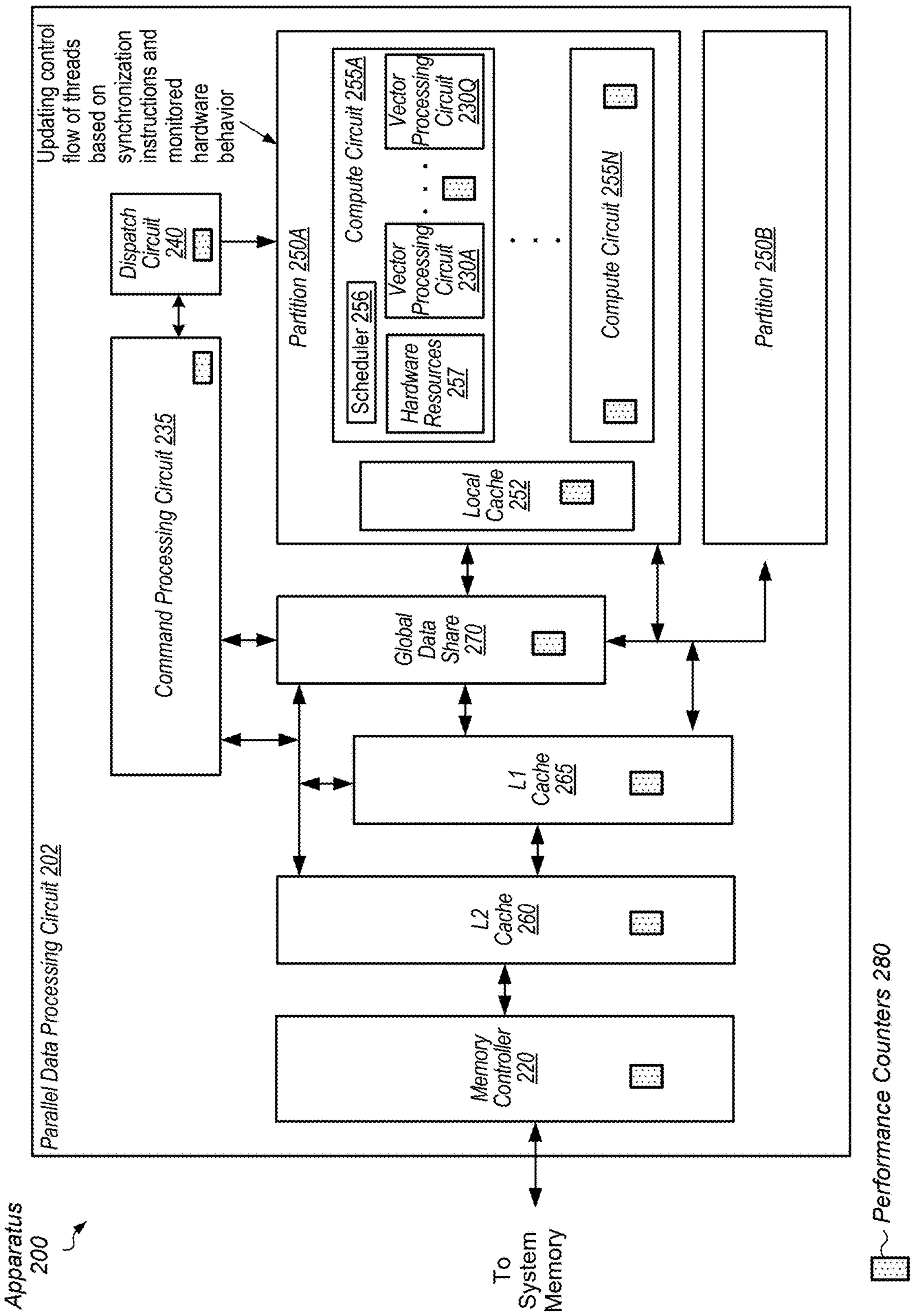
FIG. 2 is a generalized diagram of an apparatus that efficiently schedules instructions for a parallel data processing circuit.

Turning now to FIG. 2, a block diagram is shown of an apparatus 200 that efficiently schedules instructions for a parallel data processing circuit. In one implementation, apparatus 200 includes parallel data processing circuit 202 with an interface to system memory. In an implementation, parallel data processing circuit 202 is a graphics processing unit (GPU). In various implementations, apparatus 200 executes any of various types of highly parallel data applications. As part of executing an application, a host CPU (not shown) launches kernels to be executed by the parallel data processing circuit 202. The command processing circuit 235 receives kernels from the host CPU and determines when dispatch circuit 240 dispatches wavefronts of these kernels to the compute circuits 255A-255N.

Multiple processes of a highly parallel data application provide work to be executed on compute circuits 255A-255N. The parallel data processing circuit 202 includes at least the command processing circuit (or command processor) 235, dispatch circuit 240, compute circuits 255A-255N, memory controller 220, global data share 270, shared level one (L1) cache 265, and level two (L2) cache 260. It should be understood that the components and connections shown for the parallel data processing circuit 202 are merely representative of one type processing circuit and does not preclude the use of other types of processing circuits for implementing the techniques presented herein. The apparatus 200 also includes other components which are not shown to avoid obscuring the figure. In other implementations, the parallel data processing circuit 202 includes other components, omits one or more of the illustrated components, has multiple instances of a component even if only one instance is shown in the apparatus 200, and/or is organized in other suitable manners. Also, each connection shown in apparatus 200 is representative of any number of connections between components. Additionally, other connections can exist between components even if these connections are not explicitly shown in apparatus 200.

In an implementation, the memory controller 220 directly communicates with each of the partitions 250A-250B and includes circuitry for supporting communication protocols and queues for storing requests and responses. Threads within wavefronts executing on compute circuits 255A-255N read data from and write data to the cache 252, vector general-purpose registers, scalar general-purpose registers, and when present, the global data share 270, the shared L1 cache 265, and the L2 cache 260. When present, it is noted that the shared L1 cache 265 can include separate structures for data and instruction caches. It is also noted that global data share 270, shared L1 cache 265, L2 cache 260, memory controller 220, system memory, and cache 252 can collectively be referred to herein as a "cache memory subsystem".

In various implementations, the circuitry of partition 250B is a replicated instantiation of the circuitry of partition 250A. In some implementations, each of the partitions 250A-250B is a chiplet. As used herein, a "chiplet" is a semiconductor die (or die) fabricated separately from other dies, and then interconnected with these other dies in a single integrated circuit in the MCM. On a single silicon wafer, multiple chiplets can be fabricated as multiple instances of particular integrated circuitry. A first silicon wafer (or first wafer) is fabricated with multiple instances of integrated circuitry of a first chiplet, and this first wafer is diced using laser cutting techniques to separate the multiple copies of the first chiplet. A second silicon wafer (or second wafer) is fabricated with multiple instances of integrated circuitry of a second chiplet, and this second wafer is diced using laser cutting techniques to separate the multiple copies of the second chiplet.

In an implementation, cache 252 represents a last level shared cache structure such as a local level-two (L2) cache within partition 250A. Additionally, each of the multiple compute circuits 255A-255N includes vector processing circuits 230A-230Q, each with circuitry of multiple parallel computational lanes of simultaneous execution. These parallel computational lanes operate in lockstep. In various implementations, the data flow within each of the lanes is pipelined. Pipeline registers are used for storing intermediate results and circuitry for arithmetic logic units (ALUs) perform integer arithmetic, floating-point arithmetic, Boolean logic operations, branch condition comparisons and so forth. These components are not shown for ease of illustration. Each of the ALUs within a given row across the lanes includes the same circuitry and functionality, and operates on the same instruction, but different data, such as a different data item, associated with a different thread.

In addition to the vector processing circuits 230A-230Q, compute circuit 255A also includes the hardware resources 257. The hardware resources 257 include at least an assigned number of vector general-purpose registers (VGPRs) per thread, an assigned number of scalar general-purpose registers (SGPRs) per wavefront, and an assigned data storage space of a local data store per workgroup. Cache 252 can be the last level shared cache structure of the partition 250A.

Each of compute circuits 255A-255N receives wavefronts from dispatch circuit 240 and stores the received wavefronts in an instruction buffer of a corresponding local dispatch circuit (not shown). A local scheduler 256 within compute circuits 255A-255N schedules instructions of these wavefronts to be dispatched from the local dispatch circuits to the vector processing circuits 230A-230Q. In various implementations, scheduler 256 has the same functionality as scheduler 105 (of FIG. 1). Therefore, when a thread executes an instruction (e.g., wait instruction, barrier instruction) that provides a point of synchronization, scheduler 256 retrieves, from performance counters and monitors 280, metrics or parameters that characterize the hardware behavior of the corresponding one of the vector processing circuits 230A-230Q executing the wave of the thread. Scheduler 256 uses the parameters to generate a prediction of the amount of time before the point of synchronization completes. For example, the prediction indicates how soon each of the other threads of the corresponding wave are to arrive at the point of synchronization. The prediction is used by one of scheduler 256 and the lane executing the thread to update control flow of the thread.

Referring to FIG. 3, a generalized diagram is shown of program code 300 executed by circuitry to efficiently schedule instructions for a parallel data processing circuit. As shown, program code 310 includes instructions of a portion of a parallel data application that are translated into commands by a host processing circuit for execution by a parallel data processing circuit. Prior to the point of synchronization (the wait instruction "waitcnt( )"), program code 310 includes two memory access instructions ("load_data") within a "for loop" construct. The corresponding vector processing circuit uses two registers of the vector register file (r1 and r2) to process this segment of code 310.

Code 320 includes a progress test instruction ("waitcnt.completion") that provides a prediction of the amount of time until the point of synchronization is completed. It is noted that here in code 320, the prediction is a prediction of a chance of completion of the point of synchronization prior to a time threshold. The predicted chance is compared to a threshold (e.g., a percentage or otherwise). Therefore, if the chance of completion of the point of synchronization being less than a time threshold is sufficiently high (the predicted amount of time until the point of synchronization is less than the time threshold), then the variable "waitcnt.completion" is greater than the "threshold" variable and the "if" branch is taken. Otherwise, the "else" branch is taken. In other implementations, code 320 includes a comparison in the "if-else" construct that includes a direct comparison between the time threshold and the predicted amount of time until the subsequent wait instruction ("waitcnt( )") completes (the predicted amount of time until the point of synchronization completes). In such an implementation, the "if" branch of the "if-else" construct is taken when the variable "waitcnt.completion" is less than the "threshold" variable.

As described earlier regarding scheduler 105 (of FIG. 1) and scheduler 256 (of FIG. 2), to generate the prediction for the progress test instruction ("waitcnt.completion"), the scheduler or other control circuit accesses the metrics stored in hardware performance counters and hardware monitors and sensors indicating hardware behavior of the corresponding wave. As described earlier, in some implementations, the scheduler (or other control circuit) generates the prediction of the amount of time until the point of synchronization completes using a weighted sum or a bit mask in addition to table lookups. Afterward, the prediction of the amount of time is compared to a time threshold. Therefore, if the chance of completion of the point of synchronization being soon is high (the predicted amount of time until the point of synchronization is less than a time threshold), the variable "waitcnt.completion" is less than the "threshold" variable. The comparison symbol "<" would be used in the "if-else" construct. In other implementations, such as the implementation shown in code 320, the scheduler (or other control circuit) generates a prediction of a chance of completion of the point of synchronization being prior to a time threshold. The predicted chance is compared to a percentage threshold. Therefore, if the chance of completion of the point of synchronization being soon is high (the predicted amount of time until the point of synchronization is lower than a time threshold), the variable "waitcnt.completion" is greater than the "threshold" variable. In such an implementation, the comparison symbol ">" would be used in the "if-else" construct as shown.

If the prediction indicates that the point of synchronization (the subsequent waitcnt( ) instruction) would complete soon, such as completing prior to a threshold duration of time has elapsed, then one of the scheduler and circuitry in the lane executing the thread updates control flow of the thread to progress. This progression includes processing the next instructions. These next instructions are non-memory-access instructions that use the data values already retrieved from memory by the previous load instructions. These non-memory-access instructions are included in the "do_work" instructions ("do_work" function calls). These non-memory-access instructions can be a variety of arithmetic instructions that use the data values already retrieved from memory by the previous load instructions. The previous load instructions include the "r1=load_data(i+0)" instruction and the "r2=load_data(i+1)" instruction.

In various implementations, one or more of the compiler and the hardware of the parallel data processing circuit perform or otherwise cause register spilling of registers "r3" and "r4" when the "else" branch of the "if-else" construct is taken. The registers "r3" and "r4" currently store data values used by other instructions elsewhere in the kernel. A copy of these data values is created in other data storage locations such as memory where the memory is a cache or other local data storage. This operation of creating the copy of the data values from the registers in the register file to the temporary data storage location is referred to as a "spill" or performing "spilling." The operation of retrieving the copy of the data values from the temporary data storage location and storing it the registers of the register file is referred as a "fill" or performing "filling." In code 320, the "else" branch implements further loop unrolling, which requires loading new data into the registers "r3" and "r4." Since the registers "r3" and "r4" could already be storing valid data values in use by other instructions of the kernel, the data values of the registers "r3" and "r4" are spilled. These spill operations are shown by the instruction "reg_spill r3, r4→mem."

In code 320, the "else" branch of the "if-else" construct is taken when the scheduler or other control circuit predicts the point of synchronization will not complete soon. Therefore, the overhead of performing register spilling is used to increase memory-level parallelism (MLP) by unrolling the loop by 4, rather than unrolling the loop by 2. After the progress test instruction ("waitcnt.completion") has completed, there are now 4 non-memory-access instructions, rather than 2 non-memory-access instructions, that use the data values already retrieved from memory by the previous load instructions. The two additional previous load instructions include the "r3=load_data(i+2)" instruction and the "r4=load_data(i+3)" instruction. These non-memory-access instructions are included in the "do_work" instructions ("do_work" function calls). After the 4 "do_work" instructions complete, the previous valid data values in use by other instructions of the kernel are restored to the registers "r3" and "r4." These fill operations are shown by the instruction "reg_fill mem→r3, r4."

If the prediction indicates that the point of synchronization provided by the subsequent waitcnt( ) instruction would complete soon, such as completing prior to a threshold duration of time has elapsed, then the conditional control flow instruction ("if" instruction) of code 320 is predicted to be taken. When the "if" branch of the "if-else" construct is taken, the thread executes the "do_work" instructions (non-memory-access instructions in the "do_work" function calls) while using no more than the two registers of the vector register file. The "do_work" instructions ("do_work" function calls) use the data values already retrieved from memory and stored in registers "r1" and "r2" by the previous load instructions.

However, if the prediction indicates that the point of synchronization would not complete soon, such as completing after a threshold duration of time has elapsed, then the "else" branch of the "if-else" construct is taken. In such a case, one of the scheduler and circuitry in the lane executing the thread updates control flow of the thread to continue waiting on executing the "do_work" instructions ("do_work" function calls) and use more registers (four registers instead of two registers) of the register file when executing more load instructions. For example, the conditional control flow instruction ("if" instruction) is predicted to be not-taken, and the thread executes the register spilling operation and the additional "load_data" instructions to retrieve data values from memory into the registers "r3" and "r4." The processing circuitry that executes code 320 continues to use two additional registers ("r3" and "r4") of the vector register file reserved for the kernel.

In other implementations, other techniques besides register spilling and filling are used in at least one of the paths of execution. In some implementations, two versions of the "do_work" function calls are compiled with each version using a different number of intermediate registers than the other version. The use of a greater number of intermediate registers typically increases instruction-level parallelism (ILP) and performance. The first version of the two versions of the "do_work" function calls executed in the "else" branch of the "if-else" construct uses fewer intermediate registers than the second version executed in the "if" branch. The "else" path already uses more registers of the register file, so using fewer intermediate registers in the first version of the "do_work" function call helps avoid register use contention. The "if" path uses less registers of the register file, so using more intermediate registers in the second version of the "do_work" function call does not cause register use contention.

Figure 4:
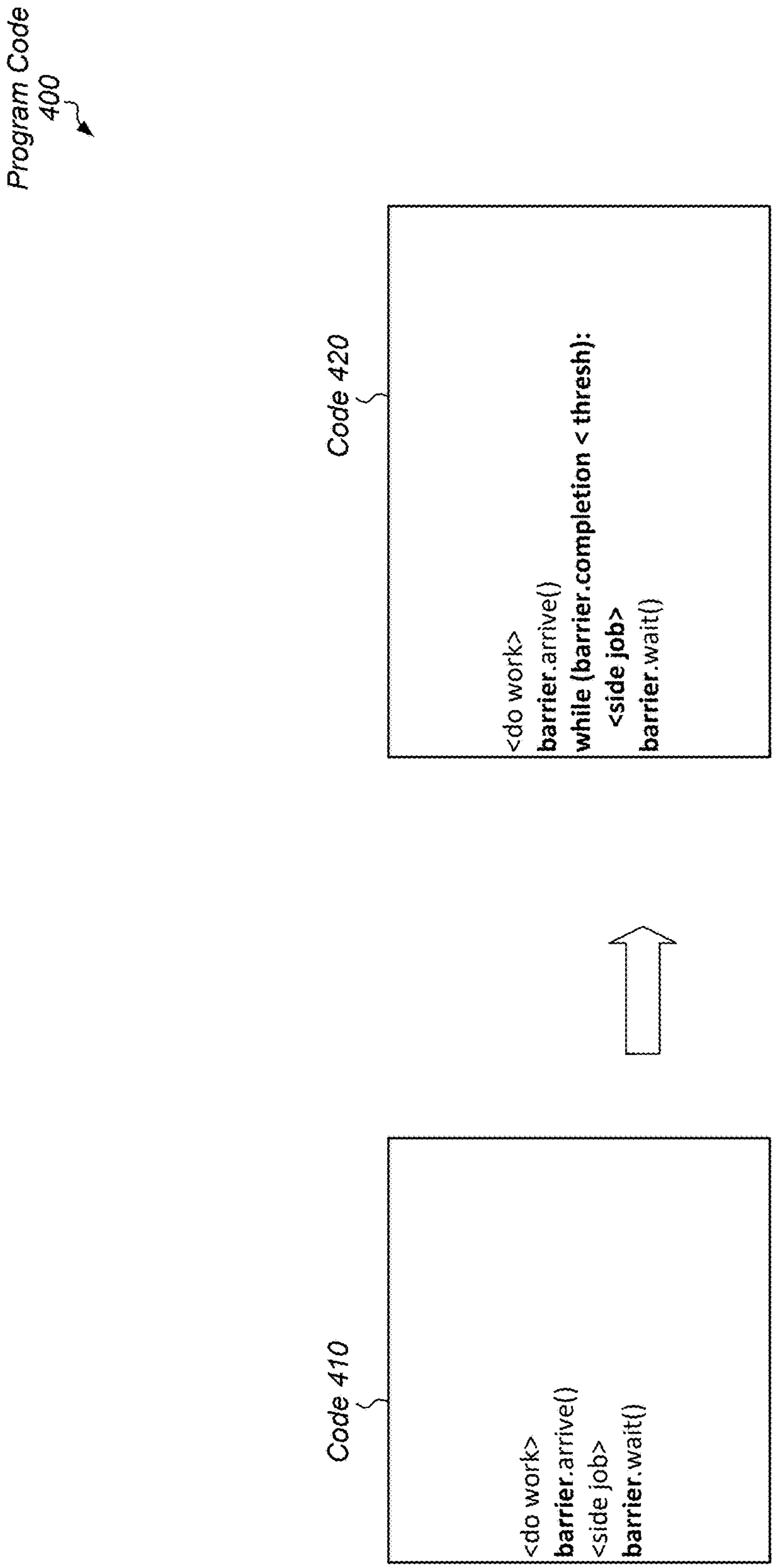
FIG. 4 is a generalized diagram of wave priority setting for efficiently scheduling memory access instructions for a parallel data processing circuit.

Turning now to FIG. 4, a generalized diagram is shown of program code 400 executed by circuitry to efficiently schedule instructions for a parallel data processing circuit. As shown, program code 410 includes instructions of a portion of a parallel data application that are translated into commands by a host processing circuit for execution by a parallel data processing circuit. After the "barrier arrive( )" instruction and prior to the point of synchronization, which is the barrier instruction ("barrier.wait( )"), program code 410 (or code 410) includes additional instructions of a function ("<side job>"). These instructions are not executed by any thread until each thread of the wave arrives at the "barrier.arrive( )" instruction.

Code 420 includes a progress test instruction ("barrier-.completion") that provides a prediction of whether the subsequent instruction ("barrier.wait( )") completes in an amount of time less than the value provided by the variable "thresh." As described earlier regarding scheduler 105 (of FIG. 1) and scheduler 256 (of FIG. 1), to generate the prediction for the test instruction ("barrier.completion"), the scheduler or other control circuit accesses the metrics indicating hardware behavior of the corresponding wave. If the prediction indicates that the point of synchronization (the subsequent barrier.wait( ) instruction) would complete soon (less amount of time than the "thresh" variable), then one of the scheduler and circuitry in the lane executing the thread updates control flow of the thread to cause the thread to wait for each thread of the corresponding wave to arrive at the "barrier.arrive( )" instruction. However, if the prediction indicates that the point of synchronization (the subsequent barrier.wait( ) instruction) would not complete soon (a greater amount of time than the "thresh" variable), then one of the scheduler and circuitry in the lane executing the thread updates control flow of the thread to cause the thread to execute the instructions of the function ("<side job>") prior to each thread of the corresponding wave arriving at arrives at the "barrier.arrive( )" instruction.

Figure 5:
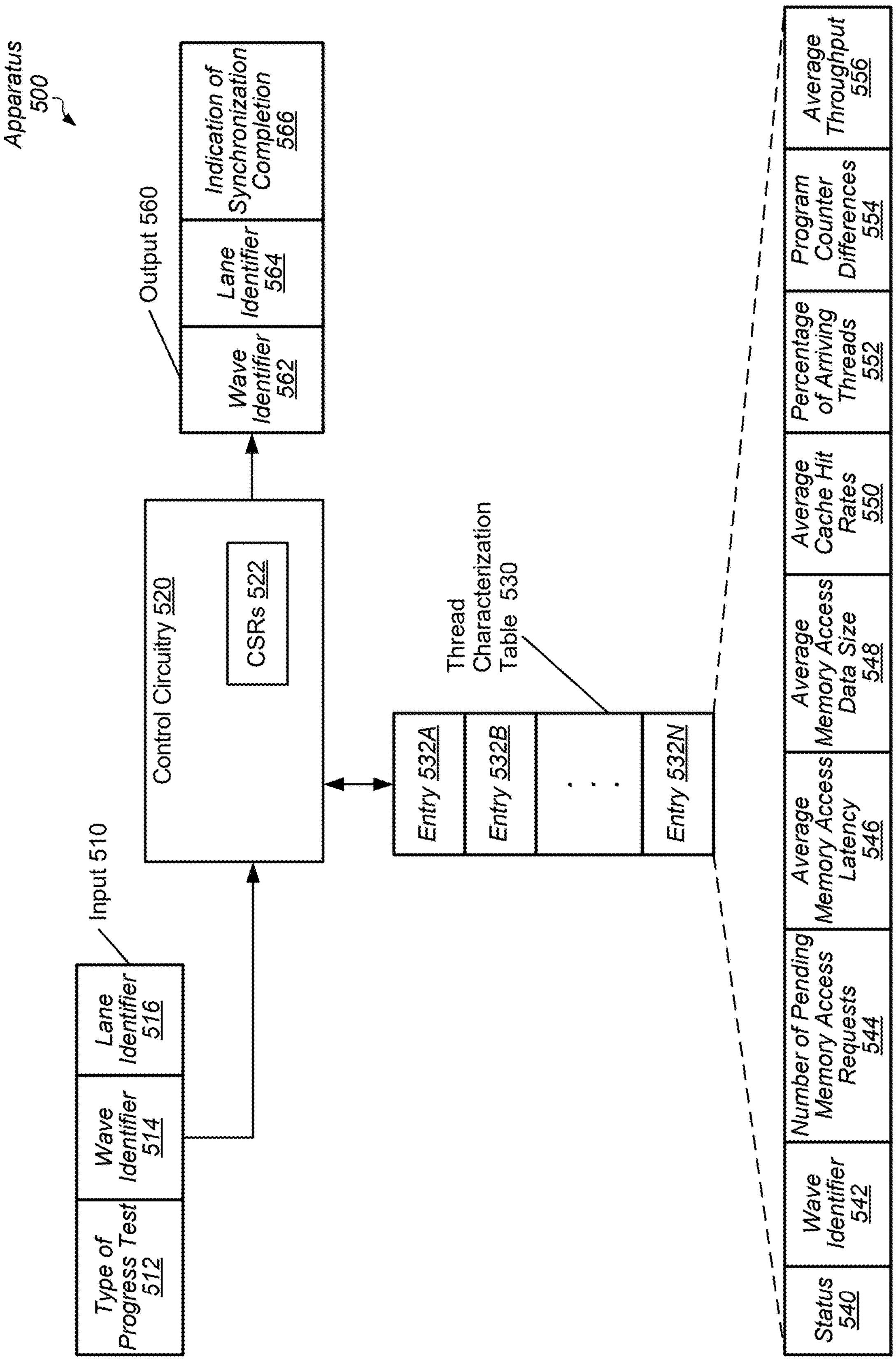
FIG. 5 is a generalized diagram of an apparatus that efficiently schedules instructions for a parallel data processing circuit.

Turning now to FIG. 5, a generalized diagram is shown of an apparatus 500 that efficiently schedules instructions for a parallel data processing circuit. In various implementations, apparatus 500 includes the functionality of a control circuit such as scheduler 105 (of FIG. 1) and scheduler 256 (of FIG. 2). As shown, apparatus 500 includes control circuitry 520 and thread characterization table 530 (or table 530). Control circuitry 520 receives input 510, control circuitry 520 accesses table 530, and control circuitry 520 generates output 560. Although particular information is shown as being stored in the fields 512-516 of input 510 and in fields 540-556 of entries 532A-532N, and in a particular contiguous order, in other implementations, a different order is used, and a different number and type of information is stored.

Control circuitry 520 receives input 510 when one of the lanes of the multiple lanes of execution of a wave reaches an instruction that queries the state of the wave executing a type of synchronization in program code. Field 512 stores the type of progress test such as indication specifying whether the synchronization is provided by a wait instruction or a barrier instruction. Field 514 stores the wave identifier (ID). Field 516 stores the lane identifier (ID).

Entries 532A-532N of table 530 are implemented by a data structure that utilizes one of flip-flop circuits, a random-access memory (RAM), a content addressable memory (CAM), or otherwise. As shown, field 540 stores status information such as at least a valid bit indicating valid information is stored in an allocated entry. Field 542 stores a wave ID of a corresponding wave being executed by parallel lanes of a corresponding vector processing circuit.

Field 544 stores a number of pending memory access requests for the wave identified by the identifier in field 542. Field 546 stores an indication of an average memory access latency for the wave. Field 548 stores an indication of the average data size of memory accesses performed by the wave. Field 550 stores an indication of the average cache hit rates of one or more levels of caches accessed by the wave.

Field 552 stores an indication of the percentage of threads of the wave that has arrived at the point of synchronization whether the synchronization is provided by a wait instruction or a barrier instruction. Field 554 stores an indication of a program counter difference between the thread that sent input 510 to control circuitry 520 and one or more other threads of the wave participating in the barrier. Other metrics for indicating how soon the other threads are to arrive at the point of synchronization are also possible and contemplated. Field 556 stores an indication of throughput for the wave. Throughput can be measured by the rate of instructions being completed or retired by the wave, the rate of instructions being issued by the wave, or otherwise. To obtain the values to store in entries 532A-532N, control circuitry 520 can send requests or queries to access hardware performance counters and a variety of types of hardware monitors distributed across the computing system.

In some implementations, control circuitry 520 includes configuration and status registers (CSRs) 522 that can store programmable thresholds and a programmable time interval. When the time interval elapses, control circuitry 520 retrieves more information to update the entries 532A-532N. Control circuitry 520 can also update entries 532A-532N based on events such as when waves are launched, when waves are retired, and so forth. Control circuitry 520 sends output 560 to the wave and lane that sent input 510. Field 562 stores the wave identifier (ID). Field 564 stores an indication of the lane identifier (ID). Field 566 stores indications of synchronization completion. In an implementation, field 564 stores a single bit to indicate whether or not the point of synchronization for the corresponding thread is expected to complete soon. The single bit result can be provided by a comparison performed by control circuitry 520 that compares a predicted (expected) amount of time for the point of synchronization to complete and a corresponding threshold. The indication (e.g., prediction, expectation) provided in field 566 can be used for conditional control flow instructions in the program code executing on the corresponding vector processing circuit.

Figure 6:
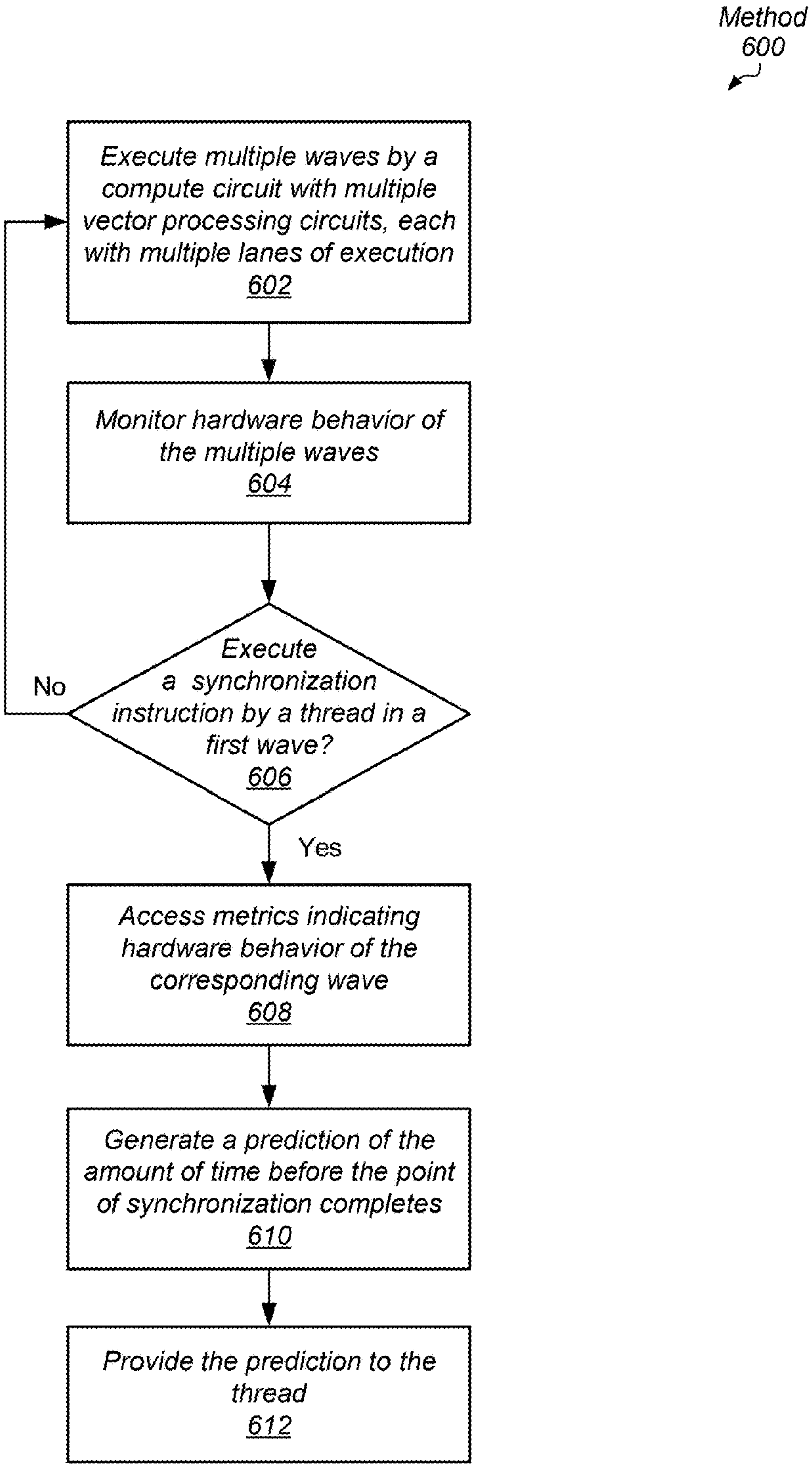
FIG. 6 is a generalized diagram of a method for efficiently scheduling instructions for a parallel data processing circuit.

Referring to FIG. 6, a generalized diagram is shown of a method 600 for efficiently scheduling instructions for a parallel data processing circuit. For purposes of discussion, the steps in this implementation (as well as in FIG. 7) are shown in sequential order. However, in other implementations some steps occur in a different order than shown, some steps are performed concurrently, some steps are combined with other steps, and some steps are absent.

For each of methods 600 (FIG. 6) and 700 (FIG. 7), a computing system includes at least a first processing circuit and a second processing circuit. The first processing circuit is a host processing circuit such as a general-purpose processing circuit that executes a host operating system. An example of the first processing circuit is processing circuit 110 (of FIG. 1). The second processing circuit is a parallel data processing circuit that has a highly parallel data microarchitecture. An example of the second processing circuit is processing circuit 102 (of FIG. 1) and apparatus 200 (of FIG. 2). The second processing circuit includes multiple compute circuits such as compute circuits 255A-255N (of FIG. 2). Each of these compute circuits includes a scheduler such as scheduler 105 (of FIG. 1) and scheduler 256 (of FIG. 2).

A compute circuit with multiple vector processing circuits, each with multiple lanes of execution, executes multiple waves (block 602). During execution, the parallel data processing circuit monitors hardware behavior of the multiple waves (block 604). The parallel data processing circuit uses a variety of types of hardware performance counters and monitors distributed across the parallel data processing circuit to perform the monitoring of hardware behavior. Examples of the type of information being monitored include a number of pending memory access requests for the wave, an average memory access latency for the wave, an indication of the average data size of memory accesses performed by the wave, an indication of the average cache hit rates of one or more levels of caches accessed by the wave, throughput for the wave that can be measured by the rate of instructions being completed or retired by the wave, the rate of instructions being issued by the wave, or other.

During execution, threads can execute an instruction that provides a point of synchronization. Examples are the wait instruction and the barrier instruction. If a thread of a wave executing on a lane of the multiple lanes of execution of a vector processing circuit has not yet reached a point of synchronization ("no" branch of the conditional block 604), then control flow of method 600 returns to block 602 where the compute circuit executes multiple waves. However, if the thread has reached the point of synchronization ("yes" branch of the conditional block 606), then a control circuit accesses metrics indicating hardware behavior of the corresponding wave (block 608). In various implementations, the control circuit is located in a scheduler. In other implementations, the control circuit is separate from the scheduler. The control circuit accesses the types of parameters or metrics as described above regarding monitored hardware behavior. In some implementations, the control circuit accesses a data structure, such as table 530 (of FIG. 5), to receive more information to use for generating a prediction of the amount of time before the point of synchronization completes. For example, how soon each of the other threads of the corresponding wave are predicted to arrive at the point of synchronization.

Examples of the other parameters or metrics accessed by the control circuit are the percentage of threads of the wave that has arrived at the point of synchronization whether the synchronization is provided by a wait instruction or a barrier instruction, a program counter difference between the thread that arrived at the point of synchronization and one or more other threads of the wave participating in the barrier. Other metrics for indicating how soon the other threads are to arrive at the point of synchronization are also possible and contemplated.

The control circuit generates a prediction of the amount of time before the point of synchronization completes (block 610). To do so, in an implementation, the control circuit accesses the parameters (or metrics) and generates a weighted sum using one or more of the parameters. The weights can be stored in programmable configuration registers. In an implementation, for generating the weighted sum, the control circuit selects a set of weights and a set of parameters based on the type of the point of synchronization. For example, the instruction that provided the point of synchronization can be at least a wait instruction and a barrier instruction. The control circuit provides the prediction to the thread (block 612). In some implementations, the prediction is the result of the weighted sum. In other implementations, the prediction is a value based on a comparison of the weighted sum and a corresponding threshold.

Turning now to FIG. 7, a generalized diagram is shown of a method 700 for efficiently scheduling instructions for a parallel data processing circuit. The compute circuit with multiple vector processing circuits, each with multiple lanes of execution, executes multiple waves (block 702). The thread that recently reached a point of synchronization receives a prediction from a control circuit indicating the amount of time until a point of synchronization completes (block 704). In some implementations, the thread executes instructions of a kernel that includes a control flow instruction prior to a wait instruction ("waitcnt( )"). The control flow instruction includes a progress test instruction ("waitcnt completion") that provides a prediction of the amount of time until the point of synchronization is completed. The control flow instruction compares the predicted amount of time to a threshold duration of time. In other implementations, the thread executes instructions of the kernel that includes a control flow instruction prior to a barrier instruction ("barrier.wait( )"). The control flow instruction includes a progress test instruction ("barrier.completion") that provides a prediction of the amount of time until the point of synchronization is completed. The control flow instruction compares the predicted amount of time to a threshold duration of time.

If the prediction indicates that the point of synchronization completes soon ("yes" branch of the conditional block 706), such as the point of synchronization is predicted to complete prior to the threshold duration of time elapsing, then one of the scheduler and circuitry in the lane executing the thread updates control flow of the thread to progress such as processing the next instructions (block 708). When the control flow instruction includes a progress test instruction ("waitcnt.completion") prior to a wait instruction ("waitcnt( )"), the thread takes an execution path that includes data processing instructions using targeted data of recently issued memory access requests as operands. The "if" branch of the "if-else" construct is taken, and in an implementation, the parallel data processing circuit also performs register spilling to reduce the number of registers of the vector register file being used. When the control flow instruction includes a progress test instruction ("barrier.completion") prior to a barrier instruction ("barrier.wait( )"), the thread takes an execution path that includes data processing instructions of a function prior to each thread of the corresponding wave arriving at the "barrier.arrive( )" instruction. The control flow of code 320 (of FIG. 3) and the control flow of code 420 (of FIG. 4) provide examples.

If the prediction indicates that the point of synchronization does not complete soon ("no" branch of the conditional block 706), such as the point of synchronization is predicted to complete after the threshold duration of time elapsing, then one of the scheduler and circuitry in the lane executing the thread updates control flow of the thread to continue waiting on other threads of the wave to arrive at the point of synchronization (block 710).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:

a plurality of vector processing circuits, each configured to execute instructions; and circuitry configured to:

responsive to executing a synchronization instruction by a first thread of a plurality of threads, generate a prediction of an amount of time for the synchronization instruction to complete based on hardware behavior of the plurality of threads; and update control flow of the first thread based on the prediction.

2. The apparatus as recited in claim 1, wherein the synchronization instruction is a wait instruction.

3. The apparatus as recited in claim 2, wherein responsive to the prediction of the amount of time being less than a threshold, the circuitry is configured to wait to perform further memory access instructions.

4. The apparatus as recited in claim 2, wherein to monitor hardware behavior of the plurality of threads of a given wave, the circuitry is configured to access hardware performance monitors that store a number of pending memory access requests for the given wave and an average cache hit rate of a cache accessed by the given wave.

5. The apparatus as recited in claim 1, wherein the synchronization instruction is a barrier instruction.

6. The apparatus as recited in claim 5, wherein the circuitry is configured to update control flow to cause the first thread to execute instructions between a barrier arrive instruction and a barrier wait instruction, responsive to the prediction of the amount of time being greater than a threshold.

7. The apparatus as recited in claim 5, wherein to monitor hardware behavior of the plurality of threads of a given wave, the circuitry is configured to access hardware performance counters that store an indication of throughput for the given wave and an indication of a program counter difference between the first thread and other threads of the given wave.

8. A method, comprising:

executing instructions of a wave by each of a plurality of vector processing circuits;

monitoring, by circuitry, hardware behavior of a plurality of threads of a given wave;

responsive to executing a synchronization instruction by a first thread of the plurality of threads, generating, by circuitry, a prediction of an amount of time for the synchronization instruction to complete based on the hardware behavior of the plurality of threads; and updating, by circuitry, control flow of the first thread based on the prediction.

9. The method as recited in claim 8, wherein the synchronization instruction is a wait instruction.

10. The method as recited in claim 9, wherein responsive to the prediction of the amount of time is less than a threshold, the method further comprises proceeding with execution of arithmetic instructions that use data values of memory access instructions already executed and waiting to perform further memory access instructions.

11. The method as recited in claim 9, wherein to monitor hardware behavior of the plurality of threads of the given wave, the method further comprises accessing hardware performance counters and hardware monitors distributed across the plurality of vector processing circuits that store a number of pending memory access requests for the given wave and an average cache hit rate of a cache accessed by the given wave.

12. The method as recited in claim 11, wherein generating, by the circuitry, a prediction of an amount of time for the synchronization instruction to complete comprises:

generating a first weight based on a percentage of threads of the wave that have arrived at a point of synchronization;

generating a second weight based on a program counter difference between the first thread and another thread of the plurality of threads of the given wave;

generating a third weight based on a number of pending memory access requests for the given wave; and generating a sum of the first weight, the second weight and the third weight.

13. The method as recited in claim 8, wherein the synchronization instruction is a barrier instruction.

14. The method as recited in claim 13, further comprising updating control flow to cause the first thread to execute instructions between a barrier arrive instruction and a barrier wait instruction, responsive to the prediction of the amount of time is greater than a threshold.

15. A computing system comprising:

a memory; and a processing circuit comprising:

a plurality of compute circuits, each comprising:

a plurality of vector processing circuits, each configured to execute instructions of a wave; and circuitry configured to:

monitor hardware behavior of a plurality of threads of a given wave;

responsive to executing a synchronization instruction by a first thread of the plurality of threads, generate a prediction of an amount of time for the synchronization instruction to complete based on the hardware behavior of the plurality of threads; and update control flow of the first thread based on the prediction.

16. The computing system as recited in claim 15, wherein the synchronization instruction is a wait instruction.

17. The computing system as recited in claim 16, wherein responsive to the prediction of the amount of time is less than a threshold, the circuitry is configured to proceed with execution of arithmetic instructions that use data values of memory access instructions already executed and wait to perform further memory access instructions.

18. The computing system as recited in claim 16, wherein to monitor hardware behavior of the plurality of threads of the given wave, the circuitry is configured to access hardware performance counters and hardware monitors distributed across the processing circuit that store a number of pending memory access requests for the given wave and an average cache hit rate of a cache accessed by the given wave.

19. The computing system as recited in claim 15, wherein the synchronization instruction is a barrier instruction.

20. The computing system as recited in claim 19, wherein the circuitry is configured to update control flow to cause the first thread to execute instructions between a barrier arrive instruction and a barrier wait instruction, responsive to the prediction of the amount of time is greater than a threshold.

* * * * *